(12) United States Patent
Kramer

(10) Patent No.: US 9,893,510 B2
(45) Date of Patent: Feb. 13, 2018

(54) ELECTRONIC CIRCUIT FOR PROTECTING A LOAD AGAINST OVER-VOLTAGE

(71) Applicant: TELEFONAKTIEBOLAGET L M ERICSSON (PUBL), Stockholm (SE)

(72) Inventor: Hans Kramer, Nynäshamn (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 126 days.

(21) Appl. No.: 14/652,841

(22) PCT Filed: Dec. 17, 2012

(86) PCT No.: PCT/SE2012/051405
§ 371 (c)(1),
(2) Date: Jun. 17, 2015

(87) PCT Pub. No.: WO2014/098659
PCT Pub. Date: Jun. 26, 2014

(65) Prior Publication Data
US 2015/0326005 A1    Nov. 12, 2015

(51) Int. Cl.
H02H 3/00 (2006.01)
H02H 3/20 (2006.01)
H05B 41/285 (2006.01)
H05B 41/292 (2006.01)
H05B 41/298 (2006.01)
H02H 7/16 (2006.01)
H02H 3/44 (2006.01)

(52) U.S. Cl.
CPC ........... H02H 3/20 (2013.01); H05B 41/2853 (2013.01); H05B 41/2858 (2013.01); H05B 41/2928 (2013.01); H05B 41/2988 (2013.01); H02H 3/44 (2013.01); H02H 7/16 (2013.01); Y02B 20/208 (2013.01)

(58) Field of Classification Search
USPC ...................... 361/18, 86–87, 91.1
See application file for complete search history.

(56) References Cited

U.S. PATENT DOCUMENTS

| | | | | |
|---|---|---|---|---|
| 5,773,965 | A * | 6/1998 | Hayashi | H02M 3/1563 323/222 |
| 6,094,040 | A * | 7/2000 | Meier | G05F 1/575 323/282 |
| 8,203,815 | B2 * | 6/2012 | Kilroy | H02H 3/202 361/111 |

(Continued)

*Primary Examiner* — Danny Nguyen
(74) *Attorney, Agent, or Firm* — Patent Portfolio Builders, PLLC

(57) ABSTRACT

An electronic circuit for protecting a load against over-voltage is disclosed. The electronic circuit comprises an input port for receiving a voltage and an output port for feeding the voltage to the load. The electronic circuit further comprises a switching unit arranged to switch on and off the voltage from the input port. Moreover, the electronic circuit comprises a capacitive component arranged to receive the voltage when the switching unit is switched on and is otherwise arranged to feed voltage to the output port. Furthermore, the electronic circuit comprises a comparing unit configured to control the switching unit to be switched off when a value at the output port exceeds a first threshold; and to control the switching unit to be switched on when the value is below a second threshold.

6 Claims, 3 Drawing Sheets

(56) References Cited

U.S. PATENT DOCUMENTS

| | | |
|---|---|---|
| 2007/0057643 A1 | 3/2007 | Zhang |
| 2008/0266740 A1 | 10/2008 | Smith |
| 2010/0308740 A1 | 12/2010 | Busse |
| 2011/0057634 A1* | 3/2011 | Kunimatsu ........... H02M 3/156 323/282 |
| 2013/0335862 A1* | 12/2013 | Xie ......................... H02H 3/06 361/18 |

* cited by examiner

ELECTRONIC CIRCUIT FOR PROTECTING A LOAD AGAINST OVER-VOLTAGE

This application is a 371 of PCT/SE2012/051405, filed Dec. 17, 2012, the disclosure of which is fully incorporated herein by reference.

TECHNICAL FIELD

Embodiments herein relate to electronics for over-voltage protection. In particular, an electronic circuit for protecting a load against over-voltage is disclosed.

BACKGROUND

Within various fields of electronics, a need for protecting electronic equipment against over-voltage may arise. Over-voltage refers herein to when electronic equipment is exposed to voltages that are high enough to harm the electronic equipment. Therefore, electronic circuits for protecting a piece of electronic equipment against over-voltage have been developed. An electronic circuit of the above-mentioned kind is herein referred to as an over-voltage circuit. Thanks to the over-voltage circuits, the piece of electronic equipment does not become exposed to over-voltages. Thus, the piece of electronic equipment does not break or become damaged. A breakage or damage of the piece of electronic equipment may disadvantageously lead to an interruption in any activity requiring the piece of electronic equipment to be fully functional.

In FIG. 1, a known over-voltage circuit 10 for protecting a device 11 against over-voltage is shown. The device may be any kind of electronic equipment. The over-voltage circuit 10 comprises an input connector 12, an output connector 13, a Zener-diode 14 and a resistor 15. The input connector 12 is arranged to receive an input voltage Vin, which sometimes may be high enough to damage or even break the device 11. Hence, an over-voltage may be feed into the input connector 12 at any time. The output connector 13 is arranged to feed voltage to the device 11. As can be seen from the Figure, the Zener-diode 14, in reversed-bias, and the resistor 15 are arranged such as to prevent a harmful over-voltage to be applied over the device 11. The device 11 is protected from over-voltage thanks to that the voltage over the Zener-diode 14 is close to or at the so called breakdown voltage of the Zener-diode 14 for a wide range of currents. Clearly, the voltage over the Zener-diode 14 is the same as the voltage over the device 11. The wide range of current may originate from current that may flow though the Zener-diode 14 due to over-voltage at the input connector 12. It shall be understood that the device 11 is required to endure, without damage, voltages up to the breakdown voltage of the Zener-diode 14.

In some fields of electronic circuit, it may be a disadvantage to use resistors and Zener-diodes as in the example above. It may for example be undesirable that the Zener-diode and the resistor occupy valuable space on a circuit board of the electronic circuit. This may lead to that the circuit broad must be larger or that other components must be removed or re-arranged. Sometimes, it may be that the Zener-diode and the resistor are unnecessarily costly in terms of purchase price. Additionally, some power is dissipated over the resistor 15, which in applications requiring low power consumption is a further disadvantage.

SUMMARY

An object is to provide an improved electronic circuit for protecting a load, such as the device mentioned above, against over-voltage.

According to an aspect, the object is achieved by an electronic circuit for protecting a load against over-voltage. The electronic circuit comprises an input port for receiving a voltage from a power source and an output port for feeding the voltage to the load. Furthermore, the electronic circuit comprises a switching unit connected to the input port and the output port. The switching unit is arranged to switch on and off the voltage from the input port. The electronic circuit further comprises a capacitive component, connected to the output port. The capacitive component is arranged to receive the voltage when the switching unit is switched on and is arranged to feed voltage to the output port when the switching unit is switched off. Moreover, the electronic circuit comprises a comparing unit, connected to the switching unit and the output port and arranged to obtain a value of the voltage at the output port. The comparing unit is configured to control the switching unit to be switched off when the value exceeds a first threshold indicating a highest voltage to be fed to the output port; and to control the switching unit to be switched on when the value is below a second threshold indicating a least voltage to be fed to the output port.

The load is protected from voltages higher than the highest voltage thanks to that the switching unit switches off the voltage originating from the power source when the value at the output port exceeds the first threshold. Continuous operation of the load is ensured thanks to that the capacitive component feeds voltage to the output port when the switching unit is switched off.

This means that no Zener-diode is required for a main purpose of over-voltage protection in embodiments of the electronic circuit as compared to the over-voltage circuit in FIG. 1. The Zener-diode is normally implemented by means of a plurality of components, which are required to be large in order to be able to handle the over-voltage.

According to embodiments of the electronic circuit, no over-voltage needs to be handled, such as dissipated or lead away to e.g. ground, by the electronic circuit. Hence, the switching unit, the comparing unit and the capacitive components are not required to be large. Therefore, the electronic circuit is improved in that it requires less space, on for example a circuit board thereof. As a result, the above mentioned object is achieved.

Additionally, the electronic circuit according to embodiments herein may be cost effective and power-saving.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
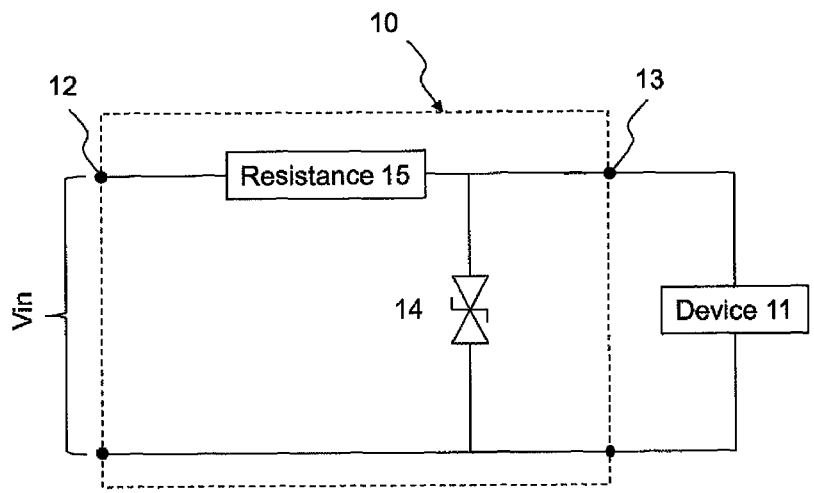
FIG. 1 is a schematic block diagram illustrating an exemplifying over-voltage circuit according to prior art.

Throughout the following description similar reference numerals have been used to denote similar elements, network nodes, parts, items or features, when applicable.

Figure 2:
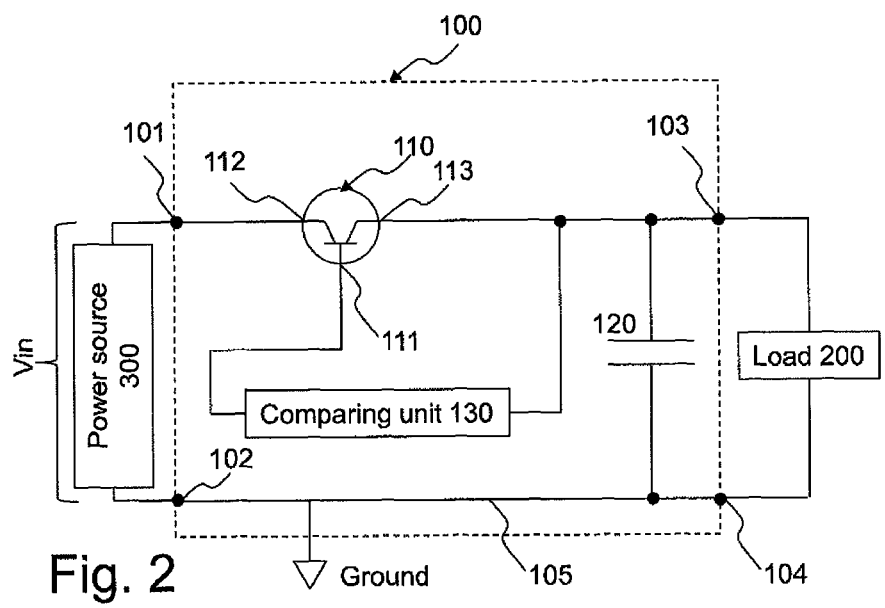
FIG. 2 is a schematic block diagram illustrating embodiments of the electronic circuit.

FIG. 2 shows an exemplifying electronic circuit 100 for protecting a load 200 against over-voltage, e.g. when the load 200 is connected to a power source 300.

The electronic circuit 100 comprises an input port 101 for receiving a voltage Vin from the power source 300. A further input port 102 of the electronic circuit 100 is also shown in FIG. 2. The voltage Vin is applied over the electronic circuit 100 by connecting the power source 300 to the input port 101 and the further input port 102. In this example, the negative potential of the power source 300 is connected to the input port 101. For various reasons, the power source 300 may expose the load 200 for over-voltages, which in this example may be voltages less than −75 V. The electronic circuit 100 further comprises an output port 103 for feeding the voltage Vin to the load 200. It shall be understood that the voltage Vin fed to the load is originating from the power source applied over the load. However, the exact value of the voltage over the load may not be equal to the voltage output from the power source 300. As seen in the Figure, the voltage over the load 200 is applied by connecting the load 200 to the output port 103 and a further output port 104. The electronic circuit 100 may further comprise a ground wire 105 between the further input port 102 and the further output port 104. The input port 101 and the further input port 102, in connection with the ground wire 105, may be arranged to receive the voltage, e.g. from the power source 300, therebetween. Expressed differently, the voltage is received between the input port 101 and the ground wire 105.

Furthermore, the electronic circuit 100 comprises a switching unit 110, connected to the input port 101 and the output port 103. The switching unit 110 is arranged to switch on and off the voltage from the input port 101. The switching unit 110 switches on and off the voltage depending on the voltage from the power source 300 as will be explained further below. In this manner, harmful voltages, such as lower than the above mentioned −75 V, is prevented from reaching the output port 103, and thus also the load 200. The switching unit 110 may have a control port 111, such as a gate, for receiving a control signal to switch on and off the switching unit 110. The control port 111 may be connected to a comparing unit 130, which is described further below. The switching unit 110 may have an input connector 112 and an output connector 113. In this example the input connector 112 is a source and the output connector 113 is a drain. In some examples, the switching unit 110 may be configured, ie. having a specific voltage threshold, internal resistance and the like, in order to be able to switch on or off the voltage from the input port 101. The switching unit 110 may be a transistor, such as N-MOS power transistor.

The electronic circuit 100 further comprises a capacitive component 120, connected between the output port 103 and the further output port 104. The capacitive component 120 is arranged to receive the voltage when the switching unit 110 is switched on. Therefore, when the switching unit 110 is switched on, the capacitive component is charged by voltage originating from the power source 300. Further, the capacitive component 120 is arranged to feed voltage to the output port 103 when the switching unit 110 is switched off. In this manner, the load 200 is supplied with voltage, which allows the load 200 to operate continuously, even though the power source 300 cannot feed voltage to the load when the switching unit 110 is switched off. In a particular application, for example when the load is a telecommunications equipment or medical equipment, it is crucial that the load can operate continuously during time instants of over-voltage. The voltage supplied to the load 200 varies in time as will be seen in FIG. 3. The capacitive component 120 may further be connected to the ground wire 105. The capacitive component 120 may be a capacitor, such as an electrolytic capacitor at for example a couple of hundreds of µFarad.

Moreover, the electronic circuit 100 comprises a comparing unit 130, connected to the switching unit 110 and the output port 103 and arranged to obtain a value of the voltage at the output port 103. In more detail, the comparing unit 130 is connected to the control port 111 of the switching unit 110. The comparing unit 130 is configured to control the switching unit 110 to be switched off when the value of the voltage exceeds a first threshold indicating a highest voltage to be fed to the output port 103; and to control the switching unit 110 to be switched on when the value of the voltage is below a second threshold indicating a least voltage to be fed to the output port 103. As an example, the highest voltage is related to the over-voltage against which the load is to be protected. Likewise, as an example, the least voltage is related to a voltage required for driving the load.

Figure 3:
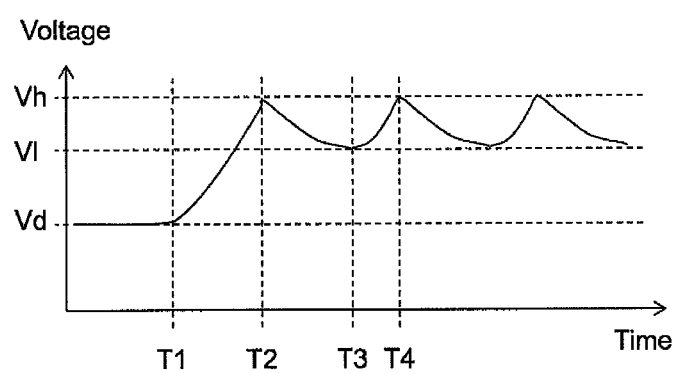
FIG. 3 is a diagram illustrating variation of voltage as a function of time in embodiments of the electronic circuit.

FIG. 3 illustrates the voltage at the output port 103 as a function of time. Up to a first time instant T1 the voltage over the load 200 is at a required driving voltage Vd. Thus, the load 200 operates normally. At the time instant T1, the voltage begins to increase, i.e. the load 200 may potentially be exposed to a harmful over-voltage. In this example, the load 200 is not harmed until a first voltage Vh, as an example of the highest voltage mentioned in conjunction with FIG. 2, is reached. Therefore, the comparing unit 130 makes sure that the switching unit 110 is switched off at a second time instant T2 in order to prevent the voltage from the power source 300 from reaching the load 200. Then, the capacitive component 120 begins to discharge its stored energy by feeding a voltage to the load 200 until the voltage at the load 200 is at a second voltage Vl, as an example of the least voltage mentioned in conjunction with FIG. 2. The second voltage Vl is reached at a third time instant T3. As can be seen from the Figure, the second voltage Vl is well above the required driving voltage Vd, but at the same time the second voltage Vl is not harmful to the load 200. At the third time instant T3, the comparing unit 130 makes sure that the switching unit 110 is switched on in order to feed the voltage from the power source 300 to the load 200. Consequently, the capacitive component 120 is charged by the voltage originating from the power source 300, since when the voltage reaches the load 200, the voltages also reaches the capacitive component 120. Therefore, the voltage over the load 200 begins to increase again and at a fourth time instant T4, the switching unit 110 switches off the voltage anew. The voltage over the load 200 varies in this manner until, the power source 300 no longer delivers a over-voltage.

Figure 4:
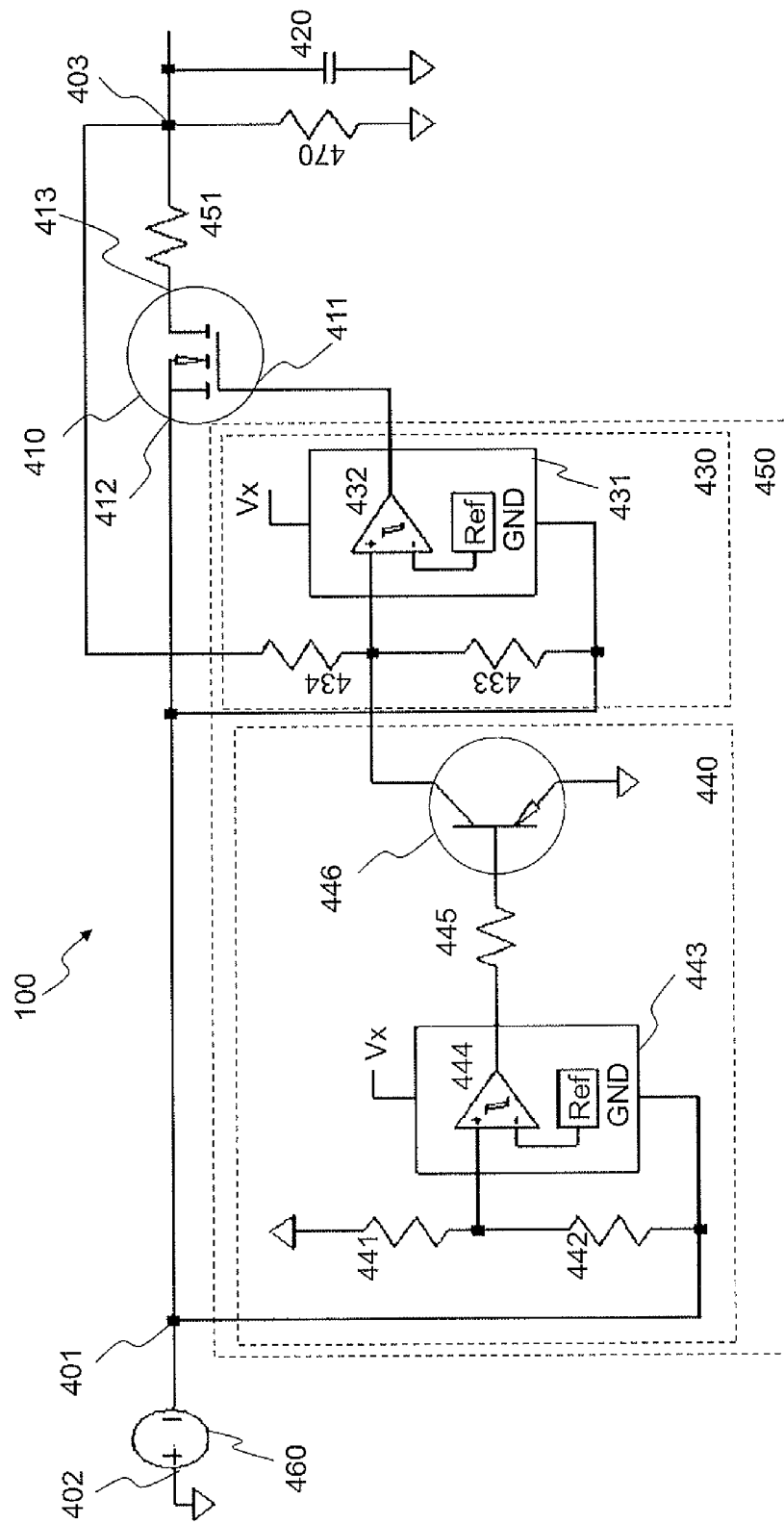
FIG. 4 is a more detailed block diagram illustrating embodiments of the electronic circuit.

FIG. 4 shows further exemplifying embodiments of the electronic circuit 100 of FIG. 2.

In this example, the switching unit 110 is exemplified by a transistor 410, having a gate 411, a source 412 and a drain 413. The transistor may be an N-channel Metal Oxide Semiconductor (N-MOS) power transistor.

The capacitive component 120 is exemplified by a capacitor 420 of for example 1000 µF.

The load 200 is denoted 470. Furthermore, the load 470 may have an exemplifying resistance of 50 ohms.

The comparing unit 130 is exemplified by a set of components 430. In this example, a comparing entity 431 is driven by a drive voltage Vx, such as +10 V. The comparing entity 431, such as LM393, comprises a comparator 432 which compares the Reference voltage, such as ground, to the voltage at output port 403, being an example of the output port 103.

The set of components 430 constituting the comparing unit 130 may also include resistors 433, 434, respectively. The resistors 433, 434 provides a voltage divider for suitable for input to the comparing entity 431.

Additionally, a further set of components 440 may be arranged to activate, i.e. supply power to, the components 431, 432, 433, 434 conditionally upon the voltage at an input port 401, which is an example of the input port 101. A comparing entity 443, such as LM393, comprises a further comparator 444. A transistor 446, or a further switching unit, may be a bipolar NPN-transistor. The transistor 446 is thus configured to perform the actual switching of the power supplied to the components 431 to 434. When the transistor 446 is switched off, the components 431 to 434 are inactivated.

More generally, the further set of components 440 may be arranged and configured to supply power to the set of components 430 when the voltage at the input port 401 is at or below −65 V. At −65 V the exemplifying limit of −75 V is being approached. Thus, the electronic circuit 100 must be prepared to switch off the switching unit 410 as soon as a harmful voltage may reach the load 470.

In this manner, a kind of two-step comparing unit may be said to comprise the set of components 450. Advantageously, power consumed for protecting the load 470 against over-voltage is somewhat reduced as compared to supplying power to the set of components 430 all the time.

Hence, according to some embodiments, the electronic circuit 100 further comprises a further comparing unit, which may comprise the further set of components 440. The further comparing unit may include a further switching unit 446, which may be connected to the comparing entity 431. Additionally, the further comparing unit may be connected to the input port 401 and arranged to obtain a further value of the voltage at the input port 401. In these embodiments, the further comparing unit may be configured to control the further switching unit 446 to be switched on when the further value exceeds a third threshold indicating that the highest voltage to be fed to the output port 403 is being approached, and to control the further switching unit 446 to be switched off when the further value is below the third threshold.

It shall here be mentioned that is it a matter of choice and perspective, which components shall be considered to be comprised in the comparing unit 430.

FIG. 4 also shows a further resistor 451, which may have an exemplifying value of 1 mOhms.

From FIG. 4, it is understood how the components shown therein are connected, arranged and configured. Thus, from the Figure, expressions for how the components may be connected, arranged and configured may be derived. Even in FIG. 4, some components have been left out for reasons of simplicity.

As used herein, the word "arrange" relates to how the components are connected and mounted. Moreover, the word "configure" relates to parameters of the components, e.g. for a resistor—resistance, for a transistor—voltage threshold, internal resistance etc., and so on for various components or units.

Even though embodiments of the various aspects have been described, many different alterations, modifications and the like thereof will become apparent for those skilled in the art. The described embodiments are therefore not intended to limit the scope of the present disclosure.

The invention claimed is:

1. An electronic circuit for protecting a load against over-voltage, the electronic circuit comprising:
   an input port for receiving a voltage from a power source;
   an output port for feeding the voltage to the load;
   a first switching unit, connected to the input port and the output port, wherein the first switching unit is arranged to switch on and off the voltage from the input port;
   a capacitive component, connected to the output port, wherein the capacitive component is arranged to receive the voltage when the first switching unit is switched on and to feed the voltage to the output port when the first switching unit is switched off;
   a first comparing unit, connected to the first switching unit and the output port and arranged to obtain a value of the voltage at the output port, wherein the first comparing unit is configured to:
      control the first switching unit, via a first comparator of the first comparing unit, to be switched off when the value exceeds a first threshold indicating a highest voltage to be fed to the output port; and
      control the first switching unit, via the first comparator, to be switched on when the value is below a second threshold indicating a least voltage to be fed to the output port, wherein the first comparator is configured to compare reference voltages that include the first threshold value and the second threshold value of the voltage; and
   a second comparing unit connected to the input port and the first comparing unit, wherein the second comparing unit comprises a second comparator in communication with a second switching unit, wherein the second comparing unit is configured to control power supply to the first comparing unit, based on the voltage received from the power source.

2. The electronic circuit according to claim 1, further comprising a ground wire, wherein the voltage is received between the input port and the ground wire.

3. The electronic circuit according to claim 1, wherein the first switching unit has a control port for receiving a control signal to switch on or off the first switching unit, wherein the control port is connected to the comparing unit.

4. The electronic circuit according to claim 2, wherein the capacitive component is further connected to the ground wire.

5. The electronic circuit according to claim 1, wherein the first switching unit is a transistor.

6. The electronic circuit according claim 1, wherein the capacitive component is a capacitor.

* * * * *